Patented Sept. 3, 1935

2,013,132

UNITED STATES PATENT OFFICE 2,013,132

CEMENTITIOUS COMPOSITION OF MATTER

Leon Louis Cailloux, Montreal, Quebec, Canada

No Drawing. Application August 2, 1933, Serial No. 683,295. In Canada August 2, 1932

1 Claim. (Cl. 106—29)

The present invention relates to a cementitious composition, and more particularly to a naturally white compound adapted to be cast in liquid state, and hardening to a compact, hard, fireproof and stable mass.

The composition of the present invention is especially applicable to a method of laying traffic marks on city street pavements and highways.

Heretofore, it has been customary, when permanent marks were necessary, to embed in the pavement a plurality of metallic stubs or members protruding slightly from the pavement surface. However, due to the unequal expansion co-efficients of both the pavement material (generally asphalt) and the metallic marker, the last marker would soon get loose in its socket and come off. Furthermore, the cost of the markers or studs, with the added cost of labor necessary to properly install said studs, comprised an outlay out of proportion with the results obtained.

Again, this metal-inserts method was limited to a dotted line, while solid lines, such as arrows or the like, were evidently out of the question.

To obviate the above noted defects, a method has been devised wherein the inserts are made of a plastic or hard material filling holes or depressions cut in the pavement proper. Said method has the further advantage that any design can be used, as well as solid lines of any length whatever, easily and conveniently.

The composition subject matter of the present invention meets perfectly the requirements of the new method in that it is indestructible, bonds perfectly with the pavement and has an expansion co-efficient very nearly the same as asphalt and the like.

Therefore, the primary object of the invention resides in the provision of a process for producing a material of the character described, which is cheap of manufacture, easy to use, perfectly white, and adapted to be easily tinted any color desired.

A further object of the invention relates to the other uses of the material for decoration purposes in buildings, wherein its inherent fireproof and stable properties may be valuable.

As an example, a preferred embodiment of the invention is disclosed herein, it being understood that variations from the quantities and materials given may be resorted to, should special conditions be encountered.

The composition is prepared in the form of a paste, the fluidity of which is adjusted to facilitate casting into cavities of an asphalt pavement, when used as a marker or used as a thick dough when moulding or hand-work thereon is necessary, such as cornices, sculptural work, etc.

To compound the paste, the following ingredients are used, the parts being by volume: Magnesia 1 part, talc or kieselguhr (siliceous matter) from $\frac{1}{10}$ to 1/20 of 1 part, and crushed or powdered silica (such as fine silica sand) $\frac{1}{2}$ to $3\frac{1}{2}$ parts.

It has been found that crushed or powdered marble or dolomite may be used in place of the silica, or marble may be added to the silica. Of course, the resultant product is not so hard, due to the different chemical reaction taking place with calcium carbonate instead of pure silica, but when hardness is not the prime requisite of the hardened compound, marble may be advantageously used.

As a wetting medium, the quantity of which may vary according to the consistency of the paste, a solution of magnesium chloride is used, of a density corresponding to 16°–25° Beaumé. To this solution is further added barium chloride in the proportions of 1/30 to 1/60 of the solid magnesium chloride used for making the said solution.

Upon mixing the above dry ingredients with a certain quantity of the magnesium-barium-chlorides solution, a chemical reaction starts at once which modifies the chemical composition of some constituents: the result is a paste setting into a solid, hard mass of substantially inalterable character.

After investigation of the reactions produced, it is believed the magnesium salt reacts with the silica, in presence of barium chloride to produce magnesium silicate, whereby the other remaining ingredients are similarly affected: the acids displaced by this reaction combine with other bases to form complex compounds of insoluble character. Whatever the exact reaction is, however, the net result greatly improves the individual characteristics of each single component to form a product having great cohesion, hardness, and of exceedingly fine texture.

Setting and drying of the composition, after casting, may take several hours, the time, however, varying according to the plasticity of the paste prior to casting.

From the foregoing, it will be apparent that the present white cement answers admirably the requirements of traffic marks for pavements either in cities or on highways.

Furthermore, the inherent properties of this cement, either white or colored, adapt it perfectly to decoration purposes for buildings or the like, special structural blocks, columns, monuments, or for any other use where a highly resistant material is required.

What I claim as my invention is:—

A composition of matter including magnesia 1 part, talc $\frac{1}{10}$ to 1/20 of a part, silica sand $\frac{1}{2}$ to $3\frac{1}{2}$ parts, and a 16°–25° Beaumé solution of magnesium chloride including from 1/30 to 1/60 the magnesium chloride weight of barium chloride.

LEON LOUIS CAILLOUX.